3,113,912
PREPARATION OF VULCANIZATES BY IRRADIATION OF BLOCK COPOLYMERS
Gerard Kraus and James N. Short, Bartlesville, Okla., assignors to Phillips Petroleum Company, a corporation of Delaware
No Drawing. Filed July 16, 1959, Ser. No. 827,432
7 Claims. (Cl. 204—154)

This invention relates to clear, colorless vulcanizates which have high tensile strengths. In one aspect, the invention relates to a method for the preparation of such vulcanizates.

It has recently been discovered that block copolymers of certain selected monomers can be prepared in the presence of an organo lithium catalyst. The block copolymers are prepared from monomers included in the following groups: (1) 1,3-butadiene, 2-methyl-1,3-butadiene, 1,3-pentadiene and vinyl-substituted aromatic hydrocarbons, (2) vinylpyridines, and (3) vinyl halides, vinylidene halides, acrylonitrile, esters of acrylic acid and esters of homologues of acrylic acid. The process comprises the steps of initially contacting a monomer selected from those included in groups (1) and (2) with an organolithium compound in the presence of a hydrocarbon diluent so as to form a polymer block; and, after polymerization of substantially all of the selected monomer, contacting the aforementioned catalyst in the presence of the polymer block initially formed and the hydrocarbon diluent with a monomer selected from those included in groups (1), (2) and (3) when the initial monomer is selected from group (1) and with the monomer selected from those included from group (3) when the initial monomer is selected from group (2), the monomer selected being different from the monomer employed in the initial contacting. We have now discovered that novel vulcanizates having outstanding properties can be prepared from certain block copolymers, particularly certain block copolymers which have been produced in accordance with the above process.

It is an object of this invention to provide novel vulcanizates which are clear and colorless and which have high tensile strengths.

Another object of the invention is to provide a novel process for preparing vulcanizates from certain block copolymers of selected conjugated dienes and other unsaturated monomeric materials.

Other objects and advantages of the invention will become apparent to those skilled in the art upon consideration of the accompanying disclosure.

The instant invention resides in the discovery that clear, colorless vulcanizates can be prepared from certain block copolymers. Broadly speaking, the process of this invention comprises the step of exposing to ionizing irradiation a rubbery block copolymer having a center block formed from a conjugated diene selected from the group consisting of 1,3-butadiene, 2-methyl-1,3-butadiene, and 1,3-pentadiene and end blocks formed from a monomer selected from the group consisting of 1,3-butadiene, 2-methyl-1,3-butadiene, 1,3-pentadiene, vinyl-substituted aromatic hydrocarbons, vinylpyridines, vinyl halides, vinylidene halides and acrylonitrile, the monomer forming the center block being different from the monomer forming the end blocks. The block copolymers which are applicable are those having the structure BBB—AAA—BBB in which the center block and the pair of end blocks are formed from the aforementioned monomeric materials. The amount of the conjugated diene employed in forming the center block is generally between about 50 and 94 parts by weight per 100 parts by weight of total monomers. The amount of monomer in each end block is usually between about 3 and 25 parts by weight per 100 parts by weight of total monomers. Although any suitable block copolymer having the aforementioned structure can be employed in the practice of this invention, it is preferred to use block copolymers which are prepared in accordance with the process described in the second paragraph of the application. The preferred rubbery block copolymers, which can be prepared in the presence of an organolithium catalyst, are those polymers which exhibit thermoplasticity but are non-tacky and are comparatively rigid at ordinary temperatures. Because of these properties, the block copolymers can be molded by extrusion or other methods and will hold their shape after the mold is removed. Many objects can, therefore, be molded and the mold removed after which the molded object can be subjected to ionizing irradiation so as to prepare the novel vulcanizates of this invention. Since it is unnecessary to employ molds during the curing or vulcanization cycle, it is seen that the use of such block copolymers as the starting material results in a definite processing advantage. Film can also be produced from the rubbery block copolymers after which it can be subjected to ionizing irradiation as disclosed herein so as to provide a very strong film which is flexible, clear and colorless.

The block copolymers employed as the starting material are prepared by initially contacting a conjugated diene selected from the group consisting of 1,3-butadiene, 2-methyl-1,3-butadiene and 1,3-pentadiene with a compound corresponding to the formula $R(Li)_x$, wherein R is a hydrocarbon radical selected from the group consisting of aliphatic cycloaliphatic and aromatic radicals and $x$ is an integer from 2 to 4, inclusive. The contacting of the conjugated diene with the organolithium compound is carried out in the presence of a diluent selected from the group consisting of aromatic, paraffinic and cycloparaffinic hydrocarbons. The preferred hydrocarbons of these types are those containing from 3 to 12, inclusive, carbon atoms. Examples of suitable hydrocarbons which can be used include propane, isobutane, n-pentane, dimethylcyclopentane, methylcyclohexane, benzene, toluene, xylene, ethylbenzene, naphthalene, and the like. Mixtures of these various materials can also be employed. The polymerization is allowed to proceed until substantially all of the conjugated diene has been polymerized as indicated, for example, by the reduction in pressure which takes place in the reaction zone. Thereafter, the aforementioned catalyst is contacted in the presence of the polymer block initially formed and the hydrocarbon diluent with a monomer selected from the group consisting of 1,3-butadiene, 2-methyl-1,3-butadiene, 1,3-pentadiene, vinyl-substituted aromatic hydrocarbons, vinylpyridines, vinyl halides, vinylidene halides and acrylonitrile. The monomer selected from this latter group is different from the specific conjugated diene employed in the initial contacting. Although a conjugated diene different from the one initially charged can be used as the second charge, it is usually preferred to employ a monomer other than a conjugated diene as the second charge material.

As hereinbefore indicated, the organolithium compound used as a catalyst in preparing the block copolymers corresponds to the formula $R(Li)_x$. The R in the formula is an aliphatic, cycloaliphatic, or aromatic radical while the $x$ is an integer from 2 to 4, inclusive. The R in the formula has a valence equal to the integer and preferably contains from 1 to 20, inclusive, carbon atoms, although higher molecular weight compounds can also be utilized. Examples of these compounds include dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2 - dilithio - 1,2 - diphenylethane, 9,10-dilithio-9,10 - dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,4,6-tetralithiocyclohexane 1,2,3,5-tetralithio-4-hexylanthracene, and the like.

The conjugated dienes which are used in preparing the block copolymers are 1,3-butadiene, 2-methyl-1,3-butadiene (isoprene) and 1,3-pentadiene (piperylene). The vinyl-substituted aromatic hydrocarbons which can be employed can be any vinyl-substituted aromatic hydrocarbon. However, it is to be understood that a compound having a substituent on the alpha carbon atom, such as alpha-methylstyrene, is not applicable to the preparation of the block copolymers. Examples of vinyl-substituted aromatic hydrocarbons which can be advantageously utilized include styrene, 1-vinylnaphthalene, 3-methylstyrene, 3,5-dimethylstyrene, 3-ethylstyrene, and the like.

The term "vinylpyridine" is intended to designate pyridines containing a vinyl radical as the sole substituent. The vinylpyridines which can be employed include 2-vinylpyridine, 3-vinylpyridine and 4-vinylpyridine. Examples of vinyl halides and vinylidene halides which can be used in preparing the block copolymers include vinyl chloride, vinyl bromide, vinylidene chloride and the like.

The process for preparing the block copolymers can be carried out at a temperature within the range of −80 to 150° C. However, it is preferred to conduct the process at a temperature in the range of −20 to 80° C. The polymerization reaction can be carried out under autogenous pressures. It is usually desirable to operate at pressures sufficient to maintain the monomeric material substantially in the liquid phase. The actual pressure employed will, therefore, depend upon the particular materials being polymerized, the diluent being employed, and the temperature at which the polymerization is to be conducted. However, higher pressures can be employed if desired, these pressures being obtained by some such method as the pressurization of the reaction with a gas which is inert with respect to the polymerization reaction.

The amount of catalyst which is used in preparing the block copolymers can vary over a rather wide range. In general, at least 0.15 milliequivalent, e.g., 0.15 to 100 milliequivalents, of the organolithium compound per 100 parts by weight of the total monomers to be polymerized is employed in the process. That is, with a dilithium initiator, at least 0.15 millimole is used while with tri- or tetralithium initiators a corresponding smaller amount can be utilized, i.e., 0.10 or 0.075 millimole. The upper limit of the amount of the organolithium compound to be used depends primarily upon the desired inherent viscosity of the polymer resulting from the polymerization. The inherent viscosity of the block copolymer produced decreases with increased amounts of the organo lithium compound. A preferred catalyst level is from 0.6 to 15 milliequivalents of organo lithium per 100 parts by weight of the total monomers charged.

In accordance with the present invention, the block copolymers, preferably prepared as hereinabove described, are subjected to ionizing irradiation so as to produce clear, colorless vulcanizates which have high tensile strengths. It has been found that very light radiation dosages, which are insufficient for curing random copolymers, improve the already high gum tensile of the block copolymers that are preferably employed in the practice of this invention. Furthermore, the properties of the vulcanizates obtained by exposing the block copolymers to light radiation dosages are usually better than the corresponding properties of polymers which are sulfur cured. Also, the clarity of the block copolymer used as starting materials is preserved. It was entirely unexpected when it was found that clear, colorless vulcanizates having tensile strengths comparable to many reinforced, conventionally cured rubbers could be obtained by merely exposing the rubber stock per se to a controlled amount of ionizing irradiation. An additional advantage of the present process resides in the fact that all polymer blocks of the block copolymer are cured by the ionizing irradiation. With a sulfur cure on the other hand, only the conjugated diene polymer block is cured.

The block copolymers to be irradiated are exposed to a source of high energy, ionizing radiation sufficient to obtain a nominal dosage rate of $10^3$ to $10^7$ Roentgen equivalent physical (rep.) units per hour, with a total dosage of about $2 \times 10^6$ to $5 \times 10^7$ reps. It is generally preferred that the total dosage does not exceed $3 \times 7$ reps. Any suitable source of ionizing irradiation having a minimum potential equivalent to X-rays, mechanical or nuclear, and preferably a source capable of producing high energy particles, can be used to irradiate the block copolymer. In general, neutrons, alpha particles, beta particles, gamma rays, or X-rays may be used to irradiate the block copolymer. The source can be, for example, any machine generating source of high energy particles, such as Van de Graaff machine, X-ray tube or the like. The irradiation can be advantageously conducted by placing the block copolymer adjacent a spent fuel element or group of fuel elements after their withdrawal from a nuclear reactor. The irradiation can be conveniently carried out while the elements are cooling off in a canal adjacent the reactor. The canal is filled with deionized water. The fuel elements can be any suitable type which are capable of producing radiation within the intensity range hereinbefore specified. In the specific runs described hereinafter in the examples, the fuel elements employed were removed from the Materials Testing Reactor which is described in Nucleonics 12, No. 4, 21–26 (April 1954). The active portion of these fuel elements comprises uranium alloy plates which are enriched in uranium-235 and covered by thin sheets of aluminum.

The actual total dosage of ionizing irradiation will vary somewhat with the particular block copolymer being used as the starting material. In the case of a block copolymer of a conjugated diene and a vinyl-substituted aromatic compound, higher irradiation dosages can be tolerated as the amount of the vinyl aromatic compound in the polymer is increased. After the optimum dosage has been reached, there is a pronounced decrease in elongation and also a decrease in tensile strength. The dosage to be used must, therefore, be controlled, and this control can be readily effected by one skilled in the art by observing the point at which degradation in physical properties of the polymer appears.

A more comprehensive understanding of the invention can be obtained by referring to the following illustrative examples which are not intended, however, to be unduly limitative of the invention.

EXAMPLE I

Four styrene/butadiene/styrene rubbery block copolymers were prepared in accordance with the following recipes:

| Run | 1 | 2 | 3 | 4 |
| --- | --- | --- | --- | --- |
| Parts by weight: | | | | |
| Butadiene | 80 | 70 | 70 | 50 |
| Styrene | 20 | 30 | 30 | 50 |
| Cyclohexane | 1,170 | 1,170 | 1,170 | 1,170 |
| 1,2-dilithio-1,2-diphenylethane, millimoles | [1] 4.25 | [1] 4.25 | [1] 3.75 | [1] 5.0 |
| Do | [1] 4.0 | [1] 4.0 | [1] 3.5 | [1] 4.75 |
| Temperature, °C | 50 | 50 | 50 | 50 |
| Time, hours | 2 | 2.5 | 2.5 | 2.5 |
| ML-4 at 212° F.[2] | 21 | 25 | 47 | 67 |
| Conversion | [3] | [3] | [3] | [3] |

[1] Two runs made with the indicated amounts of initiator and the products blended.
[2] Determined on blend of products from both runs.
[3] Quantitative.

In each of the runs, all ingredients except styrene were initially charged, and the polymerization of the butadiene was allow to continue for one-half of the total reaction time. The styrene was then added, and the polymerization was allowed to continue for the last half of the reaction period.

Samples of the polymers from each of the runs were sheeted off a mill and pressed in a hydraulic press between sheets of holland cloth to give sheets having a thickness of approximately 60 mils. Test specimens were cut from the resulting sheets and packed into aluminum cans which were evacuated and pressured with helium three times and then irradiated in a field of gamma rays from spent fuel elements from the Materials Testing Reactor at Arco, Idaho, at a canal temperature of approximately 75° F. A pressure of 10 pounds of helium was maintained in the cans during irradiation. One set of samples received a total nominal dosage of $1 \times 10^7$ rep., a second set $3 \times 10^7$ rep., and a third set $7 \times 10^7$ rep. After removal of the samples from the gamma ray field, the degree of vulcanization was determined from gel measurements. A weighed sample of rubber was extracted with n-heptane, weighed in the swollen state, and then dried and weighed again. A sample which is highly crosslinked will be swollen to a much less extent and contain less solvent than a sample which is crosslinked to a lesser degree. In addition to studying the effect of irradiation upon crosslinking, physical properties were also determined. Samples of each of the polymers were compounded in dicumyl peroxide and in sulfur recipes, cured 30 minutes at 307° F., and properties compared with those of the irradiated stocks. Compounding recipes were as follows:

|  | Parts by Weight | |
|---|---|---|
|  | Dicumyl Peroxide | Sulfur |
| Rubber | 100 | 100 |
| Dicumyl peroxide | 1 |  |
| Sulfur |  | 2 |
| Zinc oxide |  | 3 |
| Stearic acid |  | 2 |
| Santocure [1] |  | 1 |
| Flexamine [2] |  | 1 |

[1] N-cyclohexyl-2-benzothiazylsulfenamide.
[2] Physical mixture containing 65 percent of a complex diarylamine-ketone reaction product and 35 percent of N,N'-diphenyl-p-phenylenediamine.

Properties of the various stocks are shown hereinbelow in Table I.

An examination of the foregoing data indicates that the lowest irradiation level gives the best results. As the amount of styrene in the block copolymer is increased, higher dosages can be tolerated. Comparison of the results with corresponding physical properties of the original rubber show that products having better physical properties can be obtained by irradiation than can be obtained with sulfur or dicumyl peroxide curing systems and, in addition, the irradiated products are clear and colorless. Cured products of this type cannot be obtained when curatives are added.

EXAMPLE II

Two block copolymers, one an 85/15 butadiene-styrene block copolymer and the other a 15/70/15 styrene/butadiene/styrene block copolymer, were irradiated in the manner described in Example I, employing a dosage of $1 \times 10^7$ rep.

The 80/15 block copolymer was a blend of two polymers which were prepared in accordance with the following recipes:

|  | Parts by Weight | |
|---|---|---|
|  | 1 | 2 |
| Butadiene | 85 | 86 |
| Styrene | 15 | 14 |
| Toluene | 1,200 | 1,200 |
| n-Butyllithium | 0.23 | 0.18 |

The butadiene used in the preparation of the block copolymers was dried by liquid circulation through a series of silica gel columns. The toluene and styrene were dried by countercurrent purging with dry nitrogen in a packed column. The n-butyllithium was used as a 1 molar solution in pentane. Polymerization was carried out at a temperature of 122° F. in a nitrogen atmosphere. The ingredients used in the polymerization were charged in the following order: toluene, styrene, butadiene, n-butyllithium. In both of the runs, the reactions reached 100 percent conversion. The polymerizations were short-stopped with water, and 2.0 parts by weight per 100 parts of rubber

*Table I*

| Polymer from Run No. | St/Bd/St Ratio | ML-4 at 212° F. | Dicumyl Peroxide, phr. | Sulfur, phr. | Irradiation Dosage, rep. | $V_r$ [1] | 300% Modulus, p.s.i.[4] | Tensile, p.s.i.[4] | Elongation, percent [4] |
|---|---|---|---|---|---|---|---|---|---|
| 1 | 10/80/10 | 21 |  |  |  | ([2]) | 240 | 780 | 800 |
|  |  |  | 1 |  |  | 0.370 |  | 580 | 170 |
|  |  |  |  | 2 |  | 0.266 | 430 | 1,350 | 680 |
|  |  |  |  |  | $1 \times 10^7$ | 0.150 | 530 | 1,370 | 590 |
|  |  |  |  |  | $3 \times 10^7$ | 0.358 |  | 440 | 130 |
|  |  |  |  |  | $7 \times 10^7$ | 0.500 |  | 430 | 40 |
| 2 | 15/70/15 | 25 |  |  |  | ([2]) | 420 | 930 | 720 |
|  |  |  | 1 |  |  | 0.350 |  | 960 | 190 |
|  |  |  |  | 2 |  | 0.268 | 780 | 1,690 | 530 |
|  |  |  |  |  | $1 \times 10^7$ | ([2]) | 680 | 1,780 | 720 |
|  |  |  |  |  | $3 \times 10^7$ | 0.306 | 1,240 | 1,450 | 350 |
|  |  |  |  |  | $7 \times 10^7$ | 0.473 |  | 1,290 | 130 |
| 3 | 15/70/15 | 47 |  |  |  | ([2]) | 470 | 1,350 | 740 |
|  |  |  | 1 |  |  | 0.322 |  | 1,080 | 260 |
|  |  |  |  | 2 |  | 0.289 | 790 | 1,590 | 540 |
|  |  |  |  |  | $1 \times 10^7$ | ([2]) | 740 | 1,630 | 700 |
|  |  |  |  |  | $3 \times 10^7$ | 0.307 | 1,290 | 1,470 | 340 |
|  |  |  |  |  | $7 \times 10^7$ | 0.468 |  | 1,240 | 130 |
| 4 | 25/50/25 | 67 |  |  |  | ([2]) | 1,210 | 1,870 | 600 |
|  |  |  | 1 |  |  | 0.446 |  | 1,720 | [3] 180 |
|  |  |  |  | 2 |  | 0.348 | 1,540 | 2,330 | [3] 430 |
|  |  |  |  |  | $1 \times 10^7$ | ([2]) | 1,670 | 3,230 | [3] 560 |
|  |  |  |  |  | $3 \times 10^7$ | 0.380 | 2,650 | 3,010 | [3] 330 |
|  |  |  |  |  | $7 \times 10^7$ | 0.583 |  | 2,890 | 90 |

[1] Volume fraction of polymer in swollen gel. Determined by cutting samples of the vulcanized rubber weighing approximately 1.5 grams from regular tensile slabs, weighing them on an analytical balance, and allowing them to swell in n-heptane for six days at 30° C. The swollen specimens were blotted with filter paper and transferred quickly to tared weighing bottles. The volume of imbibed solvent was obtained by dividing the difference between the weight of the swollen sample and the weight of the dry, extracted sample (dried 16 hours at 70° C. in vacuo) by the density of the solvent. Next the dry samples were weighed in methanol and their volume calculated. From this volume was subtracted the volume of fillers (calculated from the recipe and original sample weight) giving the volume of rubber. The latter was used to calculate the volume fraction of rubber in the swollen polymer (Vr). This method is described in Rubber World, 135, No. 1, 67–73 (1956).
[2] Dissolved.
[3] Exhibited cold draw.
[4] Determined on Instron Testing Machine, 20 in./min. cross-head speed, 80° F. test temperature.

of phenyl-beta-naphthyl-amine was added. The polymer from run 1 had a Mooney value (ML-4) at 212° F. of 49 while that from run 2 was 59. A 40/60 weight blend of these two polymers was prepared.

The following recipe was used in preparing the 15/70/15 block copolymer:

| | Parts by weight [1] |
|---|---|
| Butadiene | 70 |
| Styrene | 30 |
| Cyclohexane | 1170 |
| Tetrahydrofuran | 1.4 |
| 1,2-dilithio-1,2-diphenylethane, mmoles [2] | 3.25 |
| Temperature, ° F | 122 |
| Time, hours | 5 |

[1] Except for initiator.
[2] An 0.218 molar solution in a 1:9 volume mixture of tetrahydrofuran and diethyl ether.

In carrying out the run, all of the ingredients except styrene were charged and allowed to polymerize for 3 hours after which styrene was added and the polymerization was continued for 2 hours. Phenyl-beta-naphthylamine was added in the amount of 1.26 parts by weight per 100 parts of rubber.

The properties of each of the above-described polymers before and after irradiation are shown hereinbelow in the table.

*Table II*

| | 85/15 | 15/70/15 |
|---|---|---|
| Irradiated, 1×10⁷ rep.: | | |
| $V_r$ | 0.230 | 0.102 |
| 300% modulus, p.s.i. | 230 | 610 |
| Tensile, p.s.i. | 290 | 1,360 |
| Elongation, percent | 390 | 700 |
| Original Rubber: | | |
| 300% modulus, p.s.i. | | 330 |
| Tensile, p.s.i. | 70 | 760 |
| Elongation, percent | 80 | 690 |
| | 340 | |

Note.—See footnotes to Table I for test methods used.

From the foregoing table it is seen that the irradiated styrene/butadiene/styrene block copolymer had very good physical properties. It was observed that the product was clear and colorless. Irradiation effected an increase of 600 p.s.i. in the tensile strength whereas in the butadiene/styrene block copolymer, the increase in tensile strength upon irradiation was only 210 p.s.i. Even after irradiation, the butadiene/styrene block copolymer had very poor properties in contrast to the multi-block copolymer which resembled a reinforced vulcanizate.

EXAMPLE III

A styrene/butadiene/styrene block copolymer and a 70/30 butadiene/styrene random copolymer were prepared. The recipes set forth hereinbelow were utilized in the preparation of these polymers:

| | Parts by Weight [1] | |
|---|---|---|
| Polymer | 15/70/15 | 70/30 |
| Butadiene | 70 | 70 |
| Styrene | 30 | 30 |
| Cyclohexane | 1,170 | 1,170 |
| 1,2-dilithio-1,2-diphenylethane, mmoles [2] | 3.2 | 1.6 |
| Temperature, ° F | 122 | 122 |
| Time, hours | 3.0 | 5 |
| Conversion, percent | 98 | Quantitative |
| ML-4 at 212° F. | 56 | 52 |

[1] Except for initiator.
[2] An 0.18 molar solution in a 1:9 volume mixture of tetrahydrofuran and diethyl ether.

In preparing the styrene/butadiene/styrene block copolymers, all ingredients except styrene were charged initially. After 1.5 hours, the styrene was charged and the reaction was allowed to continue for an additional 1.5 hours. All ingredients were charged initially in preparing the random copolymer.

The polymers prepared as described above were compounded with high abrasion furnace black (Philblack O), using 50 parts by weight of black per 100 parts of rubber. Samples of each of the stocks were irradiated as described in Example I, using a dosage of 1×10⁷ rep. The physical properties were determined on the original compounded rubbers and on the irradiated samples as shown below in Table III.

*Table III*

| | Dosage, rep. | $V_r$ | Tensile, p.s.i. | Elongation, percent |
|---|---|---|---|---|
| 15/70/15, St/Bd/St | 0 | | 990 | 180 |
| | 1×10⁷ | 0.239 | 2,440 | 220 |
| 70/30, Random Copolymer | 0 | | 210 | 80 |
| | 1×10⁷ | 0.314 | 1,930 | 680 |

Note.—See footnotes to Table I for test methods used.

From the data shown in the foregoing table, it is apparent that the tensile of the irradiated block copolymer is greater than the tensile of an irradiated random copolymer even though the amount of butadiene and styrene in the two polymers was the same.

In general, the irradiated block copolymers of this invention have utility in applications where plastic polymers and natural and synthetic rubbers are used. They can be advantageously employed in the manufacture of finished articles, such as gaskets, containers, pipe and the like, by molding or by extrusion.

As will be evident to those skilled in the art, many variations and modifications can be practiced upon consideration of the foregoing disclosure. Such variations and modifications are believed to be within the spirit and scope of the invention.

We claim:
1. A method for preparing a vulcanizate which is clear and colorless in the absence of coloring additives to the hereinafter described block copolymer comprising subjecting a block copolymer to high energy, ionizing irradiation having a potential at least equivalent to X-ray for a total dosage of about $2\times10^6$ to $5\times10^7$ rep. units, said block copolymer having a center block formed from a conjugated diene selected from the group consisting of 1,3-butadiene, 2-methyl-1,3-butadiene and 1,3-pentadiene and end blocks formed from a monomer selected from the group consisting of 1,3-butadiene, 2-methyl-1,3-butadiene, 1,3-pentadiene, vinyl-substituted aromatic hydrocarbons, vinylpyridines, vinyl halides, vinylidene halides and acrylonitrile, the monomer forming the center block being different from the monomer forming the end blocks.

2. A composition of matter comprising a block copolymer which is clear and colorless in the absence of coloring additives to the hereinafter described block copolymer comprising having a center block formed from a conjugated diene, selected from the group consisting of 1,3-butadiene, 2-methyl-1,3-butadiene and 1,3-pentadiene and end blocks formed from a monomer selected from the group consisting of 1,3-butadiene, 2-methyl-1,3-butadiene, 1,3-pentadiene, vinyl-substituted aromatic hydrocarbons, vinylpyridines, vinyl halides, vinylidene halides and acrylonitrile, the monomer forming the center block being different from the monomer forming the end blocks, said block copolymer having been subjected to ionizing irradiation having a potential at least equivalent to X-ray for a total dosage of about $2\times10^6$ to $5\times10^7$ rep. units.

3. A composition of matter comprising a clear and colorless block copolymer having a center block formed from 1,3-butadiene and end blocks formed from styrene, said block copolymer having been subjected to ionizing irradiation having a potential at least equivalent to X-ray for a total dosage of about $2\times10^6$ to $5\times10^7$ rep. units.

4. The composition of matter according to claim 2 in which said center block contains between 50 and 94 parts by weight of 1,3-butadiene and each of said end blocks contains between 3 and 25 parts by weight of styrene, based on 100 parts by weight of total monomers.

5. A method for preparing clear and colorless vulcanizates which comprises subjecting a block copolymer to high energy, ionizing irradiation, sufficient to obtain a total dosage of at least $2 \times 10^6$ rep. units, said block copolymer having a center block formed from a conjugated diene selected from the group consisting of 1,3-butadiene, 2-methyl-1,3-butadiene and 1,3-pentadiene and end blocks formed from a monomer selected from the group consisting of 1,3-butadiene, 2-methyl-1,3-butadiene, 1,3-pentadiene, vinyl-substituted aromatic hydrocarbons, vinylpyridines, vinyl halides, vinylidene halides and acrylonitrile, the monomer forming the center block being different from the monomer forming the end blocks, and said center block containing between about 50–94 parts by weight of said conjugated diene and each of said end blocks containing between about 3–25 parts by weight of said monomer, based on 100 parts by weight of total monomers.

6. A composition of matter comprising a clear and colorless block copolymer which has been subjected to high energy ionizing irradiation sufficient to obtain a total dosage of at least $2 \times 10^6$ rep. units, said block copolymer having a center block formed from a conjugated diene selected from the group consisting of 1,3-butadiene, 2-methyl-1,3-butadiene and 1,3-pentadiene and end blocks formed from a monomer selected from the group consisting of 1,3-butadiene, 2-methyl-1,3-butadiene, 1,3-pentadiene, vinyl-substituted aromatic hydrocarbons, vinylpyridines, vinyl halides, vinylidene halides and acrylonitrile, the monomer forming the center block being different from the monomer forming the end blocks, and said center block containing between about 50–94 parts by weight of said conjugated diene and each of said end blocks containing between about 3–25 parts by weight of said monomer, based on 100 parts by weight of total monomers.

7. A method for preparing a clear and colorless block copolymer comprising subjecting a block copolymer to high energy, ionizing irradiation having a potential at least equivalent to X-ray for a total dosage of about $2 \times 10^6$ to $5 \times 10^7$ rep. units, said block copolymer having a center block containing between 50 and 94 parts by weight of 1,3-butadiene and end blocks formed from styrene, each of said end blocks containing between 3 and 25 parts by weight of styrene based on 100 parts by weight of total monomers.

References Cited in the file of this patent

UNITED STATES PATENTS

| | | |
|---|---|---|
| 2,666,025 | Nozaki | Jan. 12, 1954 |
| 3,031,432 | Kern | Apr. 24, 1962 |

FOREIGN PATENTS

| | | |
|---|---|---|
| 679,562 | Great Britain | Sept. 17, 1952 |

OTHER REFERENCES

Bovey: Effects of Ionizing Radiation on Natural and Synthetic High Polymers (1958), p. 166.